United States Patent Office 3,549,322
Patented Dec. 22, 1970

3,549,322
PROCESS FOR THE MANUFACTURE OF ACICULAR RUTILE PIGMENTS FROM HYDROCHLORIC ACID TITANIUM CHLORIDE SOLUTIONS
Edgar Klein, Odenthal, Achim Kulling, Opladen, and Helmut Steinhausen, Odenthal, Germany, assignors to Titangesellschaft m.b.H., Leverkusen, Germany, a corporation of Germany
No Drawing. Filed Feb. 3, 1969, Ser. No. 796,145
Claims priority, application Germany, Feb. 17, 1968, 1,667,858
Int. Cl. C01g 23/06, 23/08
U.S. Cl. 23—202                                                 2 Claims

ABSTRACT OF THE DISCLOSURE

The invention covers a process for the manufacture of acicular and star-shaped rutile pigments from hydrochloric acid-titanium chloride solutions in which the hydrochloric acid-titanium chloride solution is hydrolyzed in the presence of a titanium nuclei and in a particular manner; and the titanium hydrate formed is calcined in the presence of growth-retarding compounds to form acicular and star-shaped rutile pigments.

BACKGROUND OF THE INVENTION

Acicular or star-shaped rutile pigments differ in their properties from the more conventional type of pigments which comprise rounded particles in characteristic fashion. This deviation has certain advantages in definite fields of application as compared with round titanium dioxide pigments.

The manufacture of an acicular pigment has been known from U.S. Pat. No. 3,329,484. According to the process described in this patent, the desired needles, in which the ratio between length and width is between about 3 and 15, are obtained by hydrolyzing a nearly iron-free hydrochloric acid solution of titanium by the addition of 4–10% $TiO_2$ nuclei, referring to the entire amount of $TiO_2$. The hydrolysis may be carried out either at 100° C. at normal pressure or in a closed vessel at temperatures over 175° C. to about 260° C. at a pressure prevailing under these conditions. In the latter case the subsequent calcination of the dried pigment at 700–900° C. is unnecessary. The omission of this processing step would, no doubt, be an advantage were it not for the necessity of carrying out the hydrolysis at relatively high temperatures under pressure, whereby expensive apparatus, including reactors of a material that will withstand the processing conditions stated, are required. Such requirements can hardly be tolerated for reasons of economy. Another disadvantage of the aforesaid process is the condition of subjecting only such solutions to hydrolysis that have been nearly completely freed of iron—which is done according to the U.S. patent under consideration by extraction of the digestion liquor containing iron by means of a solution of tributyl phosphate in toluene. This extraction renders the process very expensive. Also, the relatively high amount of nuclei added i.e. from 4–10% is economically unfavorable.

It has now been found that acicular rutile may be prepared more simply and more economically and without extraction of the iron from the hydrochloric acid digestion liquors of titanium ores, provided by careful formulation of the hydrolysis conditions the size and shape of the hydrate particles have been definitely fixed during hydrolysis and provided further that the preformed shape and size of the particles obtained during hydrolysis are preserved in the subsequent calcination owing to the presence of sufficient amounts of growth-retarding substances.

SUMMARY OF THE INVENTION

In the present invention a hot (80–100° C.) hydrochloric acid solution which has been freed by crystallization of a part of the iron and which contains 130–250 g.p.l. $TiO_2$ and whose mol ratio of free hydrochloric acid (not bound to iron) to titanium dioxide was between 2 and 5, is mixed with a titanium nuclei solution obtained from titanium tetrachloride, the amount of nuclei added, referring to the total amount of $TiO_2$, is 1–4%, preferably 2–3% and the mixture is hydrolyzed by boiling at 105° C. for from 2–3 hours. Subsequently the separated acicular titanium dioxide precipitate is calcined in the presence of compounds of one or more of the elements selected from the group consisting of potassium, rubidium, cesium, calcium, strontium, barium, aluminum, sulfur, phosphorous and silicon, preferably of phosphorous and/or silicon, as growth-retarding substances, at 800–900° C. and then milled under crystal-form preserving conditions.

DESCRIPTION OF THE PREFERRED EMBODIMENT

The conditions required for the hydrolysis with the aim of producing the pigment needles are essentially a new combination of previously known processing steps. The novel part in this invention lies in the fact that the desired acicular titanium dioxide hydrates are obtained by this new combination of steps and by careful coordination of the conditions of the hydrolysis according to the invention; and that by the presence of growth-retarding substances in the subsequent calcination the shape and size of the pigment particles produced during hydrolysis remains unchanged.

It is possible according to the present invention to influence the shape of the hydrate particles and thereby also to effect the size of pigment particles within certain limits. This invention may be directed towards producing only needle shape particles or, alternatively, particles that are star shape. There is also the possibility of influencing the ratio of length to diameter of the needles produced. Defined needle shapes are obtained either at high precipitation concentration and/or at a high ratio of "free hydrochloric acid" to titanium dioxide. "Free hydrochloric acid" is understood to be the hydrochloric acid not bound in the form of iron chloride. The higher the precipitation concentration and the higher the ratio of hydrochloric acid to titanium dioxide, within the stated limits, the greater will be the ratio of length to diameter of the needles. As the concentration of precipitation and/or the ratio of "free hydrochloric acid" to titanium dioxide is lowered, needles congregate forming starlets. The congregation of the needles takes place at an angle of 60° or 120°. Whether needle-shaped or star-shaped particles are obtained, depends also on the way the nuclei are added and the way the hydrolysis is carried out as shown by way of the examples.

The elements added as growth-retarding substances may be used singly, or combined, in the form of their oxides, hydroxides, salts or acids. There are great differences as to their efficiency in the sense of the present invention. Thus the cations are less efficient than the anions; among the latter the efficiency increases from the chlorides via the sulfates and phosphates up to the silicates. For this reason compounds of phosphoric and silicic acid are particularly suitable as growth-retardants. Moreover when used in combination with the customary basic compounds, especially those of potassium, surprisingly good results with respect to pigment quality are obtained. On the basis of the variations in effect of the compounds suitable as calcination additions, the amounts needed for a successful carrying out of the process will also vary. In the application of silicic acid, a smaller amount of addition is sufficient than in the application of phosphoric acid. Calculated as oxide and referred to the finished pigment, an addition of 0.2% $SiO_2$ is sufficient, while phosphoric acid must be added in an amount of at least 0.5% $P_2O_5$ and potassium compounds in an amount of at least 1% $K_2O$ if these are to act as growth-retardants. An addition of 0.5–1% $SiO_2$ in combination with 0.2–0.4% $K_2O$ is preferred wherein the growth retarding effect is due almost exclusively to the silicic acid.

It is not necessary for the success of the process that the growth-retarding compounds be added prior to calcination only. Substances which coprecipitate with the $TiO_2$ during hydrolysis are also efficient in the sense of the invention. Moreover provided that they go into solution during digestion, they may even be added to the ore to be processed, or be a constituent of the ore. Such a case is present in the processing of ilmenite which contains silicates soluble in hydrochloric acid. In this case attention must be paid to the reaction getting sufficient silicic acid into solution and that the silicates are not separated prematurely in the subsequent processing steps but appear in the hydrate in sufficient amounts.

The acicular hydrate particles obtained according to the process of the instant invention are composed of a multiplicity of small crystallites of rutile structure. In order to manufacture pigments with good properties from these crystallites, it is necessary that these crystallites aggregate and grow together, forming a single crystal. If this does not happen the acicular pigments produced do not have the optimum lightening and hiding power. If not properly formed by thorough crystallization, they will also fracture on milling.

It is the purpose of the growth-retarding additions according to the invention to preserve the size and exterior shape of the hydrate particles during the crystallization thus resulting in single crystals.

If, on the other hand, acicular hydrate particles are calcined in the absence of growth-retarding substances or with additions of the type and the amount as usually applied in the manufacture of pigments according to known processes, then no full crystallization in the manner desired takes place. With the growth of the crystallites within the acicular aggregates, according to known processes, a coalescence of several aggregates takes place so that simultaneously a growth of the particles themselves takes place which is accompanied by a rounding-off of the pigments. This modification of particle shape and size is desired according to previously known processes. The calcining additions must, therefore, permit appreciable growth during calcination and hence comparatively smaller amounts of growth-retarding agents are used than are required in the case of the present invention.

With the presence of the strong growth-retarding substances in sufficient amounts according to the instant invention, pigment particles which consist of acicular single crystals having optimum lightening and hiding power are obtained upon calcination. The fact that they differ in size and shape from the rounded-off particles of the prior art is seen, among other things, in a difference in relationship between the optical properties and the pigment-volume concentration. Thus, an acicular pigment produces a more bluish hue when employed at a low pigment-volume concentration than a rounded-off pigment and is more yellow at a higher pigment-volume concentration than the latter. In lightening and hiding power the acicular shape offers advantages, particularly in lower pigment-volume concentration which has, for example, a very favorable effect when used in plastics.

In paper manufacture the acicular pigment produces a higher pigment retention than the rounded-off form. It is, furthermore, remarkable that the acicular pigments are suitable for the manufacture of emulsion paints without any further post-calcination treatment, while comparable results with rounded-off pigments could be obtained only after a special post-calcination treatment.

The procedure according to the instant invention is described in more detail as follows:

The starting solutions particularly employed are those which are obtained by the digestion of ilmenite with concentrated hydrochloric acid, preferably over 37%. From these solutions 60–80% of the iron from the ilmenite present in the solution is crystallized out in the form of $FeCl_2 \cdot 4H_2O$ by cooling and separated. The remaining iron and the entire amount of magnesium remain, as chlorides, in the digestion liquor which may subsequently be subjected to hydrolysis without further measures.

The nuclei used in the hydrolysis procedure are prepared from hydrochloric acid-titanium chloride solutions, preferably from those wherein the mol ratio of "free hydrochloric acid" to titanium dioxide has been reduced to values between 1 and 3. The titanium dioxide concentration should be between 5 and 30 g.p.l. By heating the solution to 70–100° C. the necessary nuclei are formed. The duration of the heating, sometimes referred to as nuclei ripening, depends on the ripening temperature. The amount of nuclei to be added should be such that at the end of the precipitation the desired particle shape and size of the hydrate is present. In this connection a number of factors are important. In addition to the number of nuclei particles present in the nuclei solution, depending upon the method of nuclei preparation, the titanium dioxide concentration and the analytical composition of the solution to be hydrolyzed are all factors having as much effect on particle size and shape as the type of precipitating method employed. In general, 1–4%, preferably 2–3%, titanium dioxide, calculated on the total amount are needed in the form of nuclei. This percentage is at the lower limit of the amount used in previously known processes and is clearly below the amounts of nuclei addition set forth in U.S. Patent No. 3,329,484.

In general, the hot nuclei solution is prepared immediately before use and is added to the hot digestion solution at about 100° C., which is subsequently heated for ½ to 3 hours to about 105° C. in order to complete the hydrolysis. The growth-retarding agent added as calcining additions are mixed into the separated and washed precipitate in the form of their solutions prior to calcination at 800–1000° C., preferably 900° C. Subsequently milling is carried out in such a way that the needles are not destroyed.

The size and shape of the hydrate particles may be controlled by examining the hydrate by the electron microscope. However, it is also possible to carry out the determination indirectly by first examining the finished pigment produced from the hydrate or subjecting the finished pigment to other tests, for example, a blueness index determination in a grey paint system or a determination of the specific surface which permit conclusions concerning particle size and shape.

Advantages of the process according to the present invention, as compared with previously known methods for the manufacture of acicular rutile pigments, are essentially the simplified and more adaptable conditions of processing. Thus a complete removal of iron from the digestion liquor is not necessary. It suffices if only a portion of the iron is separated by crystallization in the customary manner. Also the comparatively high concentration of the starting solution, its low mol ratio of free hydrochloric acid (not bound to iron) to titanium dioxide and, most of all, the small amount of nuclei added leads to a relatively concentrated solution which allows for economical processing. And further, high starting concentration and slight dilution during hydrolysis permit the economical reuse of the precipitation filtrate for the digestion of ilmenite, after adequate saturation with HCl.

The following examples are to explain the process according to the instant invention in more detail. The lightening power of the pigments obtained were determined according to DIN 53192.

Example 1

A hydrochloric acid-titanium dioxide solution containing 150 g.p.l. $TiO_2$ (of which 3 g.p.l. are in the form of $Ti^{3+}$), 25 g.p.l. Fe, 14 g.p.l. MgO and 370 g.p.l. Cl—was prepared by digesting the ilmenite ore with 38% HCl.

To 1 liter of this solution were added 360 ml. of a freshly prepared titanium nuclei solution. The starting solution for the manufacture of the nuclei was a titanium oxychloride solution made from $TiCl_4$ with a $TiO_2$ content of 12.5 g.p.l. and a hydrochloric acid:$TiO_2$ mol ratio of 1.75. This solution was heated to 85° C. for 40 minutes for the purpose of nuclei ripening, prior to adding it to the digestion liquor which was heated to 100° C. The hydrolysis was finished by subsequent heating of the entire solution to 105° C. for 2 hours.

The precipitate was mixed with 0.28% $K_2O$ and 0.5% $SiO_2$, calculated on the calcined product, in the form of a mixture of a potassium hydroxide and a potassium silicate solution, dried and calcined for 2 hours at 900° C. The pigment obtained was milled on a mortar mill. The calcined and milled product consisted of needles some of which were crossed in a simple manner and a lesser number in a multiple-crossed manner. The ratio of length to diameter of the particles averaged 3.5:1; the determination of the lightening power, using the method of DIN 53192, gave a value of 800.

If, in the present example, the ratio of HCl:$TiO_2$ were reduced or if the precipitating concentration were lowered, then starlets would be formed in preference to needles which would approach the characteristics of the rounded-off pigments.

Example 2

1 liter of the same digestion liquor as used in Example 1 was heated to 100° C. and added to 240 milliliters of a nuclei solution which corresponded, in reference to concentration and manufacture, to the nuclei solution employed in Example 1 with the exception of the ripening of the nuclei. This was carried out in the present case within 10 minutes at 100° C. The addition was made in the course of 80 minutes. During this time the temperature in the receiving vessel was maintained at 100° C., subsequently increased to 105° C. and left at this temperature for 2 hours. To the separated and washed precipitate, according to Example 1, 0.28% $K_2O$ and 0.5% $SiO_2$ in the form of potassium hydroxide and a potassium silicate solution were added, whereupon calcination was carried out at 900° C. for 2 hours. The pigment obtained had the shape of the particles described in Example 1 wherein the ratio of length to diameter of the individual needles averaged 3.7:1. It had a lightening power of 800. The method of processing described in this example, i.e. nuclei solution in the receiving vessel and the slow addition of the digestion liquor, is less sensitive to a variation of the ratio HCl:$TiO_2$ and to the precipitating concentration than the method described in Example 1. Under these conditions acicular pigments are obtained even at a ratio HCl:$TiO_2$ of 2:1.

Example 3

The same solutions as in Example 1 were employed. Precipitation and separation also were carried out in the same manner as that described in Example 1. Calcining additions were, in addition to a potassium hydroxide solution, phosphoric acid solution and in such amounts that the pigment, calcined for 2 hours at 900° C., contained 0.28% $K_2O$ and 0.6% $P_2O_5$. The shape of the pigment particles corresponded to those of Examples 1 and 2; and the ratio of length to diameter averaged 3.7:1. The lightening power was 810.

Example 4

Example 1 was repeated except that the precipitate calculated on the calcined product, was mixed only with 0.28% $K_2O$ in the form of a solution of potassium hydroxide. After calcination at 900° C. for 2 hours, a pigment was obtained which consisted mainly of rounded-off particles, of which the average ratio of length to diameter was 1.6:1.

While this invention has been described and illustrated by the examples shown, it is not intended to be strictly limited thereto, and other variations and modifications may be employed within the scope of the following claims.

We claim:

1. A process for the manufacture of pigmentary acicular, needle-like particles of rutile titanium dioxide, or star-shaped, congregated particles thereof, which comprises the steps of:
    (a) digesting titaniferous iron ore material with hydrochloric acid having a concentration greater than 37%;
    (b) after digestion, cooling the solution until 60%–80% of the iron content of said titaniferous iron ore is crystallized out therefrom in the form of $FeCl_2 \cdot 4H_2O$ and separating said $FeCl_2 \cdot 4H_2O$ and leaving a hydrochloric acid solution containing 130–250 g.p.l. $TiO_2$ and having a mol ratio of free hydrochloric acid to titanium dioxide of from 2 to 5;
    (c) heating said hydrochloric acid solution to a temperature of 80°–100° C.;
    (d) mixing the heated hydrochloric acid solution with a freshly prepared nuclei containing solution obtained from heating a hydrochloric acid-titanium chloride solution to 70°–100° C. until the said nuclei are formed and ripened, the amount of the nuclei added being from 2%–3% calculated on the total amount of titanium dioxide;
    (e) hydrolyzing the resultant mixture by heating to a temperature of 105° C. for from 1 to 3 hours to precipitate an acicular or needle-like titanium dioxide hydrate therefrom;
    (f) calcining said precipitated hydrate in the presence of a mixture of compounds selected from the group consisting of (1) potassium and silica and (2) potassium and phosphorus, as growth retarding substances, at a temperature of from 800°–900° C. for 2 hours and then milling the calcined product under crystal-form preserving conditions.

2. Process according to claim 1 in which the acicular titanium dioxide hydrate is calcined in the presence 0.2–1% $SiO_2$ with simultaneous addition of 0.2–0.4% $K_2O$ based on the $TiO_2$ basis.

References Cited

UNITED STATES PATENTS

| | | | |
|---|---|---|---|
| 2,369,246 | 2/1945 | Peterson | 23—202X |
| 2,516,548 | 7/1950 | Cauwenberg et al. | 23—202 |
| 3,236,596 | 2/1966 | Zirngibl et al. | 23—202 |
| 3,329,484 | 7/1967 | Long et al. | 23—202 |
| 3,337,300 | 8/1967 | Hughes | 23—202 |
| 3,407,033 | 10/1968 | Ruter et al. | 23—87 |

EDWARD STERN, Primary Examiner

U.S. Cl. X.R.

23—87